United States Patent [19]

Pira et al.

[11] 4,304,750
[45] Dec. 8, 1981

[54] PROCESS FOR THE EDGE KNURLING OF A THERMOPLASTIC WEB

[75] Inventors: Francois J. Pira, Edegem; Jozef C. Van Wijk, Lint, both of Belgium

[73] Assignee: AGFA-GEVAERT N.V., Mortsel, Belgium

[21] Appl. No.: 40,427

[22] Filed: May 18, 1979

Related U.S. Application Data

[60] Continuation of Ser. No. 744,238, Nov. 23, 1976, abandoned, which is a division of Ser. No. 669,623, Mar. 23, 1976, Pat. No. 4,021,179, which is a continuation of Ser. No. 474,989, May 31, 1974, abandoned.

[30] Foreign Application Priority Data

Jun. 1, 1973 [GB] United Kingdom ............... 26249/73

[51] Int. Cl.³ .............................................. B29C 17/00
[52] U.S. Cl. .................................... 264/284; 264/293
[58] Field of Search ................ 264/284, 293; 425/363, 425/367, 385

[56] References Cited

U.S. PATENT DOCUMENTS

| | | | |
|---|---|---|---|
| 1,651,744 | 12/1927 | Van Derhoef | 425/394 |
| 2,551,005 | 5/1951 | Johnson | 264/284 |
| 2,752,632 | 7/1956 | Winstead | 425/363 |
| 3,261,903 | 7/1966 | Carr | 264/289 |
| 3,305,422 | 2/1967 | Hamilton | 264/284 |
| 3,502,765 | 3/1970 | Spencer | 264/284 |
| 3,832,267 | 8/1974 | Lin | 264/210.2 |

FOREIGN PATENT DOCUMENTS

| | | |
|---|---|---|
| 467445 | 6/1937 | United Kingdom . |
| 1392838 | 4/1975 | United Kingdom ................ 264/160 |

Primary Examiner—James B. Lowe
Attorney, Agent, or Firm—William J. Daniel

[57] ABSTRACT

A moving length of a thermoplastic web is subjected to edge knurling along the margins of its two opposite edges by passing each of such margins through a knurling zone including a backing wheel in supporting engagement with the reverse surface of the margin and in engagement with the obverse margin surface a freely rotatable knurling wheel carrying a plurality of raised minute surface projections thereon as an exterior knurling pattern, while heaving a portion of the rim periphery to a temperature sufficiently high to soften a surface stratum of the web margin by conduction from the heated rim, and simultaneously adjusting the force exerted by the two wheels on the web margin to cause said knurling projections to enter and depress localized areas of the heat softened surface stratum while the regions of the same surface stratum adjacent such depressed areas become upset and raised above the original surface without causing deformation of the reverse web surface as a consequence of the entry of the knurling projections into the obverse web surface stratum.

1 Claim, 5 Drawing Figures

PROCESS FOR THE EDGE KNURLING OF A THERMOPLASTIC WEB

This is a continuation of Ser. No. 744,238, filed Nov. 23, 1976, now abandoned, which was a division of Ser. No. 669,623, filed Mar. 23, 1976, now U.S. Pat. No. 4,021,179, issued May 3, 1977, which was in turn a continuation of Ser. No. 474,989, filed May 31, 1974, now abandoned.

FIELD OF THE INVENTION

The present invention relates to a process for the edge knurling of a thermoplastic web.

BACKGROUND OF THE INVENTION

At certain stages of their manufacture, many kinds of webs have to be coiled up for transportation to the places where they are given further treatments. Sometimes they have to be stored for long periods before the subsequent treatment takes place. Very often one or both surfaces of these webs are in such a condition that they get impaired in case they are brought into contact, especially prolonged contact or contact under great pressure.

In the manufacture of film, especially photographic film, it is common practice to physically deform the edges of the film during some stage of its manufacture in order to increase the thickness of the edges. It is known that even a slight thickening of the edges is adequate to hold apart the convolutions of the film and is sufficient to avoid the production of defects.

A further reason for edge knurling is the securance of the relative position of the windings of a roll of coiled web material so that the risk of telescoping deformation of the roll during its winding and in particular during its transportation, is very small.

In the manufacture of solvent-type webs such as cellulose triacetate film base, it is common practice to cold knurl the edges of the film at some stage which is situated between the steps of complete drying of the solidified film and winding up of the film. The film edges are conveyed between the nip of a free-rotating wheel, the peripheral surface of which is deformed in accordance with the desired knurling pattern, and a roller or wheel with a smooth peripheral surface. Depending on the surface hardness of the smooth roller or wheel the required knurling force may slightly vary but it anyway frequently occurs that the pressure between the wheels for obtaining the desired knurling must be so high that elongation of the marginal portions of the web cannot be avoided. Such elongation is easily apparent as it causes wrinkling or fluting of the film edges of the film in longitudinal direction thereof, and as such film with fluted edges is coiled up, it is noticed that the diameter of the axial end portions of the film roll is greater than the diameter of the corresponding portions of a roll of film without fluted edges.

The fluted edges of a film may cause serious troubles in the coating of the film since different coating systems, such as an air knife coater or a cascade coater comprise mechanical parts which are spaced at some tenths of a millimeter only from the web path. Another difficulty which occurs less frequently is that more film material than that corresponding with the actual knurling width must be cut away in order to obtain film without fluted edges.

Another difficulty which occurs in the treatment of cellulose triacetate films is the permanent reduction of the knurling depth of the knurled film edges. A reduction up to 50% of the original knurling depth of the film edges may occur at the first winding-up of the film and this reduction may continue, though to a lesser extent, during the successive winding-up operations of the film which take place at the consecutive steps in the manufacturing process comprising the coating of subbing, light-sensitive, anti-stress and other layers on the film. Hence, the risk of telescoping deformation of a roll of film as a consequence of insufficient edge pressure increases towards the final stage of the production cycle and, unfortunately, the economic losses run parallel with such number of stages in the production. A roll of film with insufficient edge pressure as a consequence of a decrease of the knurling depth after the film has been coiled up, is easily recognizable. Indeed, if one looks at the ends of such roll in the axial direction one may see that the cross-section of the roll has an oval rather than a circular shape under the influence of gravity.

Still another difficulty is that the initial edge knurling depth which may be required to anticipate the reduction of the knurling depth, may be so striking that the film becomes liable to transverse rupturing as a consequence of mechanical weakening of its edge portions.

In the manufacture of oriented polymeric thermoplastic webs, such as polyethylene terephthalate film, it is known to warm knurl the edges of a web by locally preheating the edge portions of the web immediately prior to the knurling operation. The preheating may be done by means of an infrared heater but in that case it is impossible to limit the heating of the web to the width of the edge portion which has to be knurled, and since the heating of the film is likely to influence the crystallinity of the film, it occurs that once the knurled edges have been trimmed, the edges of the remaining web portion are still defective. In case the preheating is done by means of heated rollers, the heating must necessarily be higher than actually required to compensate for losses during the web transport from the preheating zone to the knurling zone. Furthermore, the preheating by means of a roller occurs uniformly according to the width of the web edge portion and thus a web surface which considerably exceeds the actual surface to be knurled must be heated, which requires an increased amount of heating energy.

OBJECT OF THE INVENTION

It is the aim of the present invention to provide for edge knurling, which offer a much better control over the width and the depth of the knurling.

GENERAL DESCRIPTION OF THE INVENTION a process of edge knurling a thermoplastic web wherein at least one edge of the web is heated to facilitate knurling thereof, which process is characterized in that the heating of the said edge or edges is effected, as the web is knurled, by heat transfer from a tool or from tools used for such knurling.

The term "edge" as used in this specification in relation to a web denotes a strip-like portion of the web, located at or adjacent a side boundary thereof. Knurled web edges normally have a width of the range from some millimeters to about one centimeter. Usually, the knurled web edges are spaced over a distance of a few millimeters from the side boundaries of the web.

Apparatus according to the invention may for example comprise, on one or each marginal portion of a web path, a knurling wheel and an opposed backing wheel, means for controlling the force exerted by said wheels on a web which is passed with an edge between the nip of said wheels, and means for heating said knurling wheel to a temperature sufficient to cause weakening, i.e., softening, of the web surface, i.e., a surface stratum, in contact with the knurling wheel in order to promote the knurling of said surface.

Such an apparatus may be used for knurling a web from each of its opposed faces by passing the web through the apparatus twice, the web being inverted between the successive passes. In order to knurl a web from both faces thereof simultaneously a second knurled wheel may be used as the said backing wheel on one or each marginal portion of the web path. Such second knurled wheel may also be associated with heating means therefor.

According to a preferred embodiment of the apparatus according to the invention, the apparatus comprises at least one knurling wheel having a hub and a rim which are interconnected by means which limit the heat transfer by convection or conduction from said rim to said hub, and means is provided for heating the rim by heat convection through the air from such heating means which is mounted close to the outer surfaces of the rim of the wheel and which extends over at least 180 angular degrees of said rim. The said heating means may itself be stationary.

DESCRIPTION OF THE DRAWINGS

The invention will be hereinafter described by way of example with reference to the accompanying drawings, in which.

DETAILED DESCRIPTION OF THE INVENTION

Figure 1:
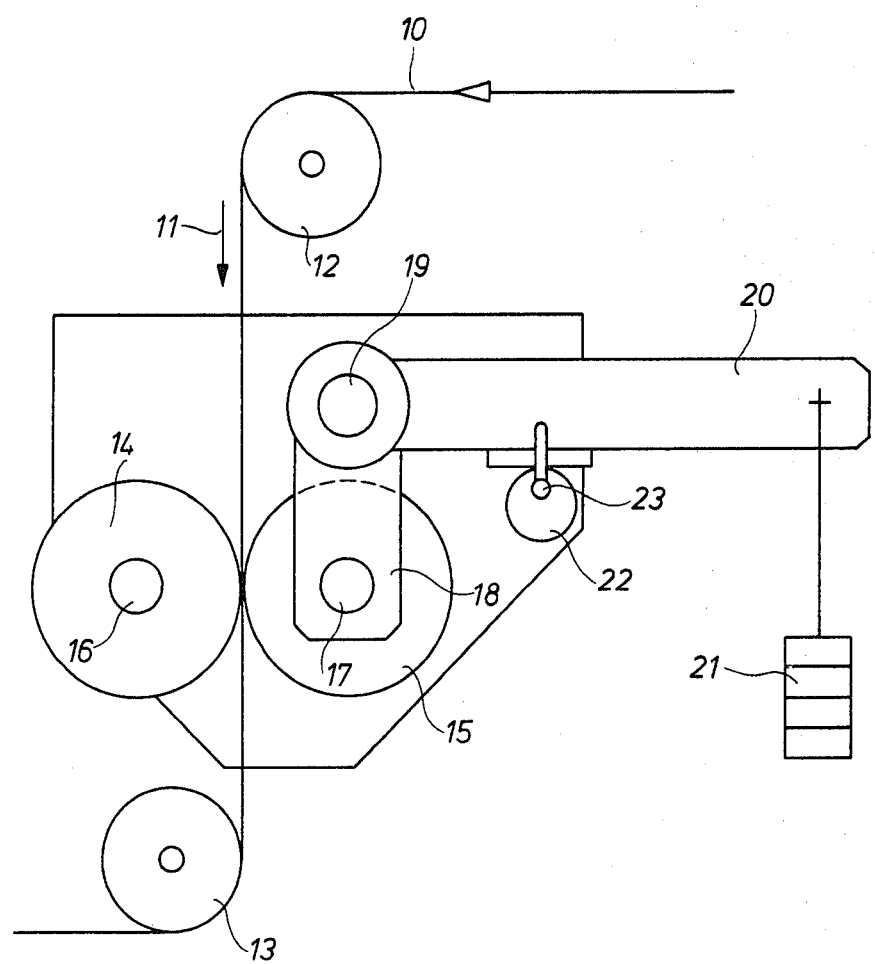
FIG. 1 is a diagrammatic illustration of the web path in one embodiment according to the invention.

Referring to FIG. 1, a web 10 of thermoplastic material is moving downwardly as indicated by the arrow 11. The web is pulled over freely rotatable guide rollers 12 and 13 which contact the web over its full width.

The knurling of the web is illustrated for one web edge only, and is performed by means of knurling wheels 14 and 15. The two wheels are free rotatable on shafts 16 and 17 which are so mounted that in the operative position as shown in the figure, the common tangent plane to the two wheels coincides practically with the plane of the web between the guide rollers 12 and 13. The shaft 16 is mounted in a stationary way whereas the shaft 17 is fitted to the vertical arm 18 of an angled lever which is fitted to a shaft 19. The horizontal arm 20 of the lever is loaded at its extremity with a weight 21 which controls the knurling force. A small cam 22 is fitted for pivotal movement to a pin 23 and may be rotated over 180 degrees so as to lift the arm 20 and thereby remove the knurling wheel 15 from the opposed wheel 14.

Figure 2:
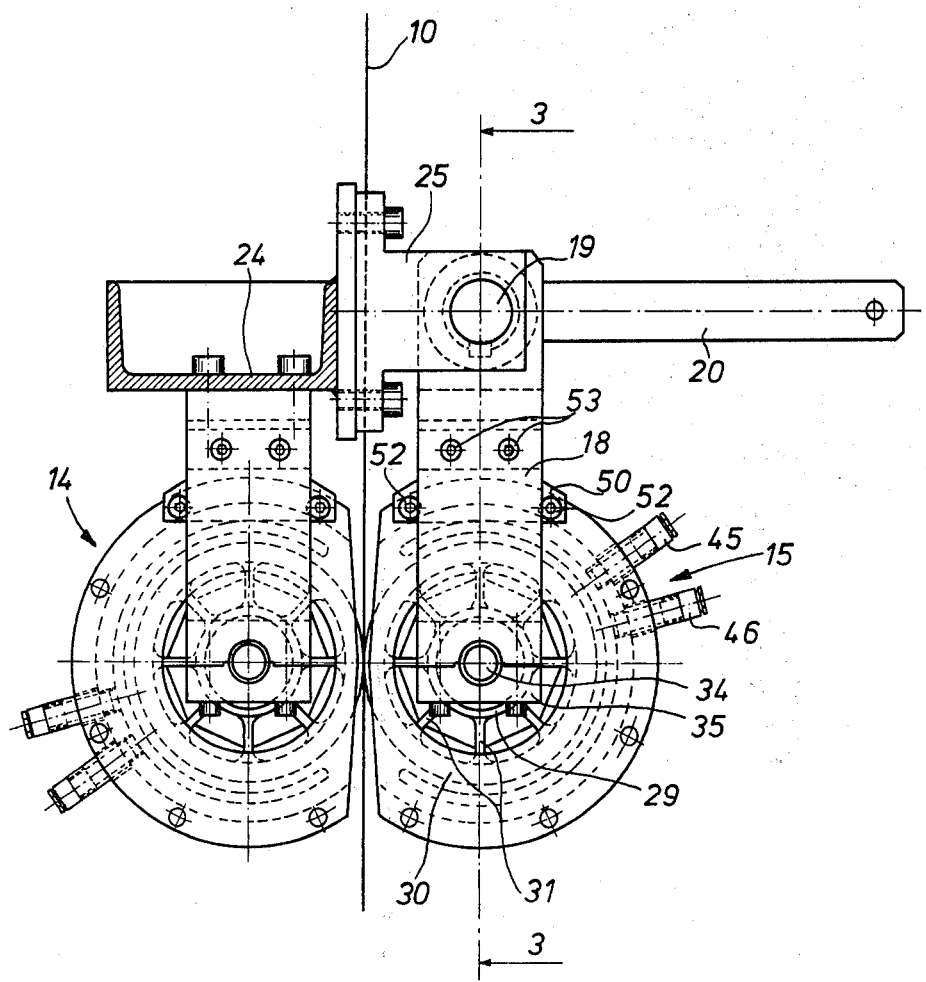
FIG. 2 is a detailed side view of the apparatus according to FIG. 1.
Figure 3:
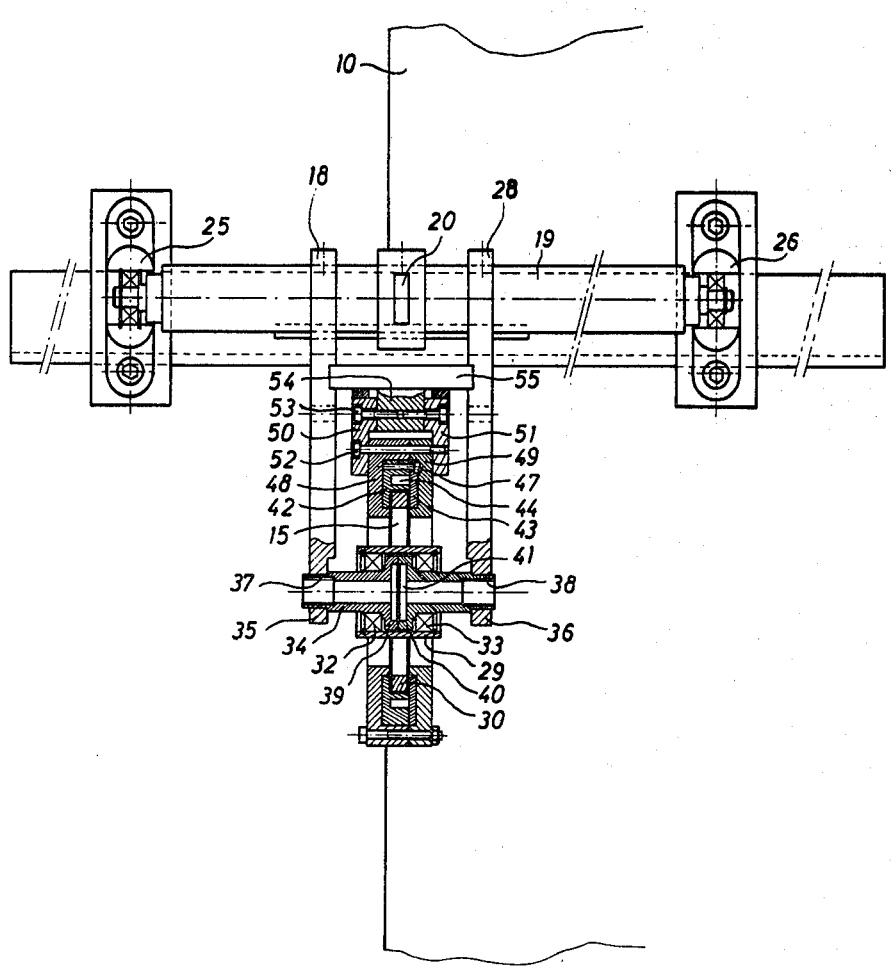
FIG. 3 is a sectional view on line 3—3 of FIG. 2.

While FIG. 1 is a diagrammatic illustration only of the apparatus according to the invention, FIGS. 2 and 3 are detailed views of the apparatus. FIG. 2 is a side view of the knurling wheels and the supporting structure, whereas FIG. 3 is a sectional view on line 3—3 of FIG. 2.

A horizontal U-shaped beam 24 extends parallel to the path of the film 10 and is provided with bearing blocks 25 and 26 wherein a shaft 19 is journalled for pivoting.

An arm 20 which controls the pivotal movement of the shaft is fitted centrally to the shaft whereas at both sides of the arm 20 there are fitted to the shaft arms 18 and 28 which support the displaceable knurling wheel 15. The knurling wheel comprises a hub 29, a rim 30 and a plurality of spokes 31. The rim 30 of the wheel has approximately a square section. The hub 29 of the wheel is journalled by roller bearings 32 and 33 on a short stationary shaft 34 which is fitted to the arms 18 and 28 by means of clamping blocks 35 and 36. The shaft is hollow and is provided at its ends with inner threads 37 and 38 for connection to flexible conduits of a cooling circuit. The shaft has been manufactured as two separate parts which have enlarged portions 39 and 40 thereby to form an inner chamber 41 for increased contact with the cooling liquid. The two parts of the shaft have been welded to each other and then turned off to the exact outer dimensions.

The heating of the wheel occurs by an arcuate heating member which surrounds the wheel over about 260 angular degrees and which comprises a grooved part 42 and a flat part 43. The inner periphery of the grooved part 42 is provided with a recess the shape of which generally corresponds with that of the rim of the wheel, and a groove 44 wherein an electrical heating element is located. The electrical connection of said heating element occurs at terminals 45 and 46 (FIG. 2).

The part 43 is fitted to the part 42 by screws 47 and the parts thus assembled form a heating member which closely surrounds the outer surfaces of the rim of the wheel, that is to say the lateral surfaces and the outer peripheral surface of the rim, at a distance of about 1 mm. The heating member is surrounded by heat-insulators 48 and 49 which equally extend over about 260 angular degrees. The insulators 48 and 49 are fitted with screws 52 between yokes 50 and 51. The yokes are secured with screws 53 to a block 54 which is fixed to a small beam 55 which in its turn interconnects the arms 18 and 28.

Figure 4:
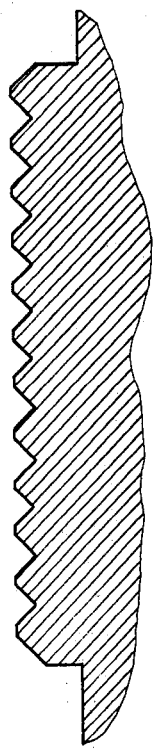
FIG. 4 is a sectional view illustrating the peripheral surface of a knurling wheel.

The peripheral surface of the knurling wheel is illustrated in FIG. 4 by an enlarged portion of a radial cross-sectional view of the wheel, the axis of the wheel running vertical in the representation of FIG. 4.

The construction of the bodily stationary knurling wheel 14 and its corresponding heating member is similar to that of the movable wheel 15 disclosed hereinbefore and therefore needs no further description.

The following examples illustrate the improvements which may be obtained by the knurling technique according to the present invention as compared with conventional cold knurling.

EXAMPLE 1

A polyethylene terephthalate film of a thickness of 0.18 mm was cold and warm knurled to obtain a conventional line-knurling having a uniform width of 10 mm.

The cold knurling was carried out by means of conventional knurling wheels which were provided with about 23 knurling projections per cm2, pointing to a pitch of about 2 mm. The warm knurling, on the contrary, was carried out by means of a knurling wheel having 153 knurling projections per cm2, pointing to a pitch of about 0.8×0.8 mm.

The term "knurling pitch" as used hereinbefore points to the distance between the centers of the knurling projections measured on the periphery of the knurling wheel, and the mentioning of two equal values points thereto that the pitch as measured in the axial direction of the wheel equals the pitch as measured in the tangential direction.

It was found that the knurling depths, namely about 25 $\mu$m, and the knurling forces, namely about 25 kg, were equal in both cases if the warm knurling was carried out at a wheel temperature of 120 centigrades and the cold knurling occurred at room temperature, that is 20 centigrades.

The term "knurling depth" as used hereinbefore points to the total increase in thickness of the film edge as a consequence, either of cold knurling which deforms the film edge by locally raising portions of the film surface which is remote from the knurling wheel, or of warm knurling in which a knurling wheel deforms the film edge by locally raising portions of the film surface which is in contact with that knurling wheel. In case of cold knurling one may say that the thickness of the distinct knurled film areas has practically not changed but that localized regions of the film material have been "displaced" bodily to one side of the plane of the film thus producing a projection on one side of the film and a corresponding recess at the opposite side. In case of warm knurling, on the contrary, a knurling roller acting at one side of the film may and generally does leave the opposite surface of the film undeformed, whereas the surface which is in contact with the knurling wheel becomes deformed by the upsetting of film material around the areas-where the knurling projections entered the film surface. In the case of single knurling, i.e. the combination of one knurling wheel with an opposite smooth wheel the surface of the film in contact with the latter wheel may thus be undeformed. In the case of double knurling i.e. the combination of two opposed knurling wheels, the knurling depth will be almost twice as great as that obtained for single knurling at equal knurling force.

It appears that warm knurling permits a deformation of the film surface which is about 6.5 times the deformation achieved with cold knurling under the same knurling force.

EXAMPLE 2

A triacetate film of a thickness of 0.14 mm was cold and warm double-knurled at a speed of 10 m/min. The temperature of cold knurling was 20 centigrades, the temperature of the knurling wheels for warm knurling was 120 centigrades.

The knurling was carried out by knurling wheels having a diameter of 12 cm and a width of 10 mm and a knurling pitch of 2×2 mm, respectively of 0.8×0.8 mm. The knurling force was about 25 kgs.

After the knurling has been completed, the knurling depth is measured and then the knurled film edge is placed under a loading pressure of 4 kg/cm² for a period of 24 hours. Then a first measurement (designated B in the following table) for any change in the knurling depth was carried out with the loading pressure in place after which the loading pressure was removed and a second measurement (designated A) was made. In the following table, the proportions of the original knurling depth that were found to be retained by the film by the two measurements are identified, expressed as a percentage of the initial knurling depth.

TABLE

| | Relative knurling depth after a 24 hour loading of 4 kg/cm² | |
|---|---|---|
| Knurling pitch in mm | A (with loading removed) | B (with loading in place) |
| 2 × 2 cold knurling | 57 | 53 |
| 2 × 2 warm knurling | 78 | 57 |
| 0.8 × 0.8 warm knurling | 93 | 57 |

It appears from this table that the warm knurling causes little increase in the knurling depth at a charge of 4 kg/cm2. After removal of the loading pressure, however, it appears that the warm knurling considerably improves the the recovery from the loss in initial knurling depth resulting from loading of the knurled edges for a given period. This points to a greatly increased elasticity of the edge knurling which is particularly advantageous for avoiding telescoping deformation of a film roll.

EXAMPLE 3

The double knurling as described in example 2 was repeated for a polyethylene terephthalate film with a thickness of 0.18 mm. The hot knurling occurred at 120 centigrades.

TABLE II

| | Relative knurling depth after a 24 hour's charge of 4 kg/cm² | |
|---|---|---|
| Knurling pitch in mm | A (no charge at measurement) | B (charge of 4 kg/cm² at measurement) |
| 2 × 2 cold knurling | 73 | 80 |
| 2 × 2 warm knurling | 96 | 80 |
| 0.8 × 0.8 warm knurling | 96 | 86 |

It appears that the gain in knurling depth which may be obtained by the warm knurling is less striking for polyester film than for triacetate film. This is particularly due to the inherent physical properties of polyethylene terephthalate film which ensure a greater resistivity against deformation of knurled edges even if they have been produced by cold knurling.

EXAMPLE 4

A triacetate film which is provided with a subbing layer is cold and warm double-knurled in order to establish the difference in dust production. The dust measurement has been made by sucking up an air volume of 3 liters around the knurling wheels and by analysing it for dust particles ranging from 0.5 to 5 $\mu$m, and particles greater than 5 $\mu$m. Each value in the table is the average value of 5 samplings. The dust measurement has been carried out by means of the Royco aerosol paticle monitor, Model 220, marketed by Royco Instruments, Inc., Menlo Park, Calif., U.S.A. In order to allow for further comparison, the dust content of the air at the knurling wheels has also been measured when the film was at rest and when the film was moving while no knurling occurred.

TABLE III

| Subbed triacetate film | Dust particles between 0.5 and 5 μm | Dust particles greater than 5 μm |
|---|---|---|
| Film at rest | 89 | 0.8 |
| Moving film, no knurling | 167 | 1.6 |
| Cold double knurling | 198 | 73 |
| Warm double knurling | 372 | 4.6 |

It appears that cold knurling produces an amount of large dust particles about 15 times greater than does warm knurling (73 versus 4.6).

The production of small dust particles, on the contrary, is almost doubled (372 versus 198) for warm knurling as compared with cold knurling. Taking into account, however, that the smaller dust particles are much less harmful than the greater ones, it will be appreciated that also as for dust production the warm knurling of a film means a considerable improvement over cold knurling.

The choice of a film with a subbing layer for the present example is explained by the fact that the trend in modern coating installations is to apply the subbing layer or layers to a film immediately after the production of the film base, and prior to the first winding of the film, so that the knurling of the film necessarily must damage the subbing layer, involving an increased production of dust.

Figure 5:
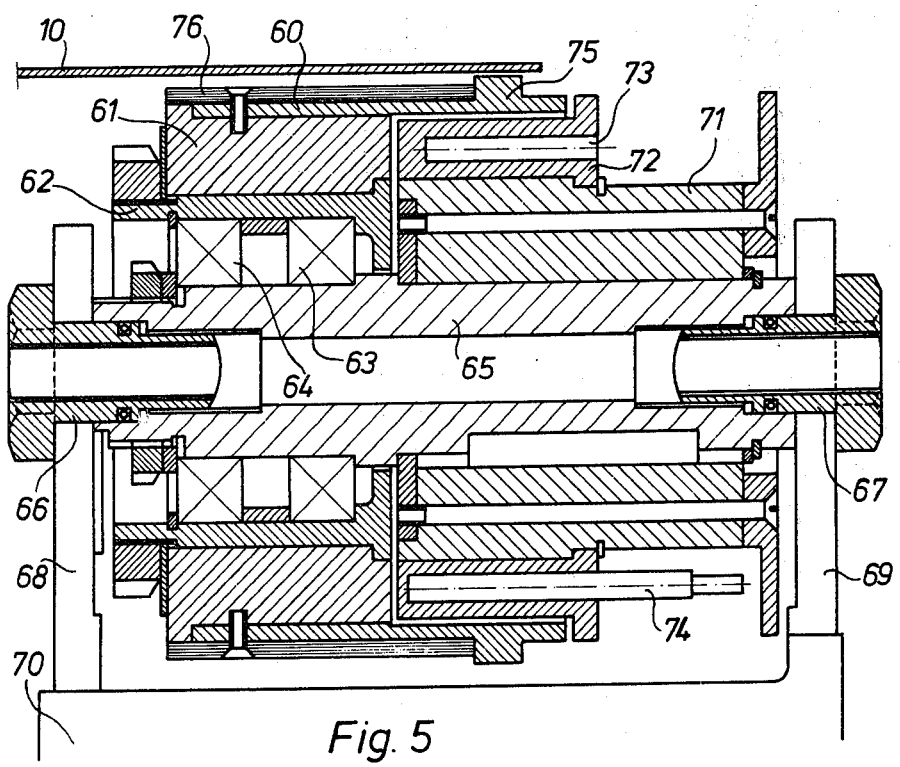
FIG. 5 is an axial cross-sectional view of another embodiment of a knurling wheel.

A second embodiment of knurling wheel for the warm knurling of a web in accordance with the invention is illustrated by the longitudinal sectional view of FIG. 5. Unlike the knurling wheels described hereinbefore in FIGS. 2 and 3, the present knurling wheel is heated by heat transfer from a member located closely adjacent to the inner surface of the rim of the knurling wheel.

The knurling wheel comprises a rim 60, a heat-insulating ring 61 and a hub 62 which is rotatably journalled by roller bearings 63 and 64 on a stationary shaft 65. The shaft is hollow and is clamped by two bolts 66 and 67 between arms 68 and 69 which are fitted to a supporting beam 70. The bolts 66 and 67 have an axial bore which is threaded so that the bolts may be connected to a liquid circuit and a cooling liquid may flow through the shaft 65. A second heat-insulating ring 71 is fitted in a stationary way to the shaft 65 and supports a ringlike heating member 72 which is provided with a plurality of equally angularly spaced bores 73 wherein each time a heating cartridge is placed, except for the lowermost bore where a thermostat 74 is placed which forms a protection for the device against occasional overheating.

The rim of the wheel is provided with a ledge 75, the outer peripheral surface of which is provided with the desired knurling pattern. Finally, a sleeve 76 of heat-resistant and low-friction polymeric material such as Teflon (Registered Trademark) is provided around the rim of the knurling wheel at the left side of the ledge 75 according to the FIGURE, for avoiding damage to a web 10 which would possibly touch the wheel at a place beside the knurling ledge.

Various components such as screws, sealing rings, etc. of the knurling wheel are not further described since they are not essential for the understanding of the operation of the wheel.

In the operation of the knurling wheel, a web 10 is in tangential contact with the ledge 75 of the wheel and is presented thereon by an appropriate backing wheel, not shown in the FIGURE. The heating member 72 heats the wheel by convection through the air gap separating said member 72 from the right-hand half of the rim 60 of the wheel.

It will be understood that the present invention is not limited to the described embodiments.

The smooth backing wheel, in the case of single knurling, may be replaced by a roller which supports the web over its full width and which may operate as a common backing support for two knurling wheels which knurl the two edges of the web on one side.

The knurling need not necessarily be a line knurling as described hereinbefore, but may have the form of other patterns known in the art such as a crenelated pattern, a pattern which is periodically interrupted, a pattern which enables to distinguish by touch the left from the right hand edge of the web, etc.

The cooling of the shaft of the knurling wheel or wheels may be omitted in many cases. As a matter of fact, the only reason for cooling the shaft is to keep the temperature of the roller bearings sufficiently low to avoid rapid degradation of the lubricant, and in case the heat-insulation between the rim and the hub of the wheel is sufficiently great to limit heat transfer from the rim to the hub, then very often the cooling of the central portion of the wheel may be omitted.

The heating of the knurling wheels may also occur in other ways. For instance, the electrical heaters may be embedded in the rim portion of the wheel, the electrical connections being effected by rings and brushes.

Alternatively, the heating members which transfer heat to the wheels as described hereinbefore with reference to FIGS. 1 to 5 may be heated by hot oil or the like, rather than electrically. Finally, we refer to other techniques known in the art for producing heat, such as inductive low frequency or dielectric high frequency heating which may be used to directly generate heat in the rim portion of the knurling wheel.

We claim:

1. A process for edge knurling a moving length of a thermoplastic web having two opposite side edges which comprises the steps of: passing each of the opposite edge margins of said web through a knurling zone, said zone comprising a backing wheel in supportive engagement with the reverse surface of said margin and a freely rotatable knurling wheel in engagement with the obverse surface of said margin, said knurling wheel having a plurality of raised minute surface projections thereon to form an exterior knurling pattern; heating the knurling wheel to an elevated temperature sufficient to soften an obverse surface stratum of said web margin by conduction from said wheel; and adjusting the force exerted by said wheels on the web margin passing through the nip thereof to cause the areas of the heated and softened obverse surface stratum to be entered by said projections and thereby depressed and the regions of the same surface stratum adjacent said depressed areas to become upset and raised relative to the original web surface without deformation of the reverse surface as a consequence of said entry of said surface stratum by said projections.

* * * * *